F. W. ERICKSON.
CONDUIT PIPE COUPLING.
APPLICATION FILED APR. 30, 1920.

1,378,015.

Patented May 17, 1921.

Inventor:
F. W. Erickson

UNITED STATES PATENT OFFICE.

FREDERIC WM. ERICKSON, OF EAST GREENWICH, RHODE ISLAND.

CONDUIT-PIPE COUPLING.

1,378,015. Specification of Letters Patent. Patented May 17, 1921.

Application filed April 30, 1920. Serial No. 377,797.

*To all whom it may concern:*

Be it known that I, FREDERIC WM. ERICKSON, residing at East Greenwich, in the county of Kent and State of Rhode Island, have invented certain Improvements in Conduit-Pipe Couplings, of which the following is a specification.

This invention has reference to improvements in interior conduits and to a form of coupling for the same which insures lightness and cheapness of structure, in which the threaded members are locked in position and prevented from becoming loose and detached.

The improved coupling consists of three cylindrical members, two of which are oppositely similar to face each other and are provided on the inner ends with semi-circumferential lips or turned in extensions adapted to engage each other and inclose a portion of the ends of the conduit pipes; their outer ends are provided with one or more slits so that they can become enlarged in diameter. And a sleeve portion adapted to inclose the said two members and couple them.

In the drawing which forms a part of this specification, Figures 1 and 2 are perspective views of the complementary members or bushings.

Figures 1, 2:
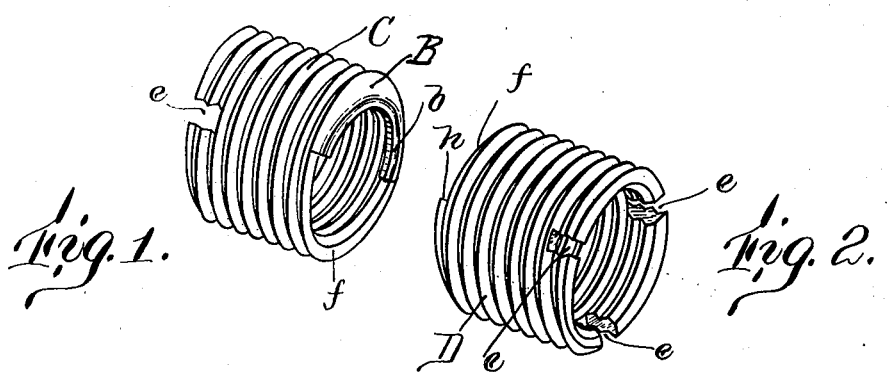
Figures 3, 4:
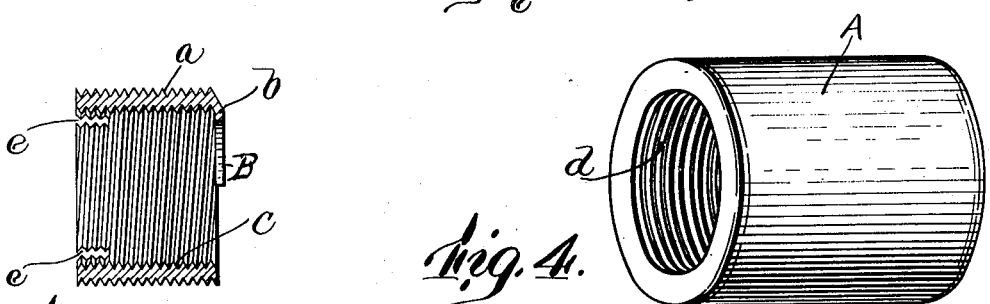
Fig. 3 is a horizontal section of one of the bushings.
Fig. 4 is a perspective view of the union or coupling.

In the drawings Figs. 1 and 2 indicate the two threaded portions C or bushings of the coupling. Fig. 4 shows the third member which is an ordinary standard threaded pipe coupling A, with an internal thread $d$. The threaded bushing as shown in Fig. 1 has an external thread and an internal thread, the internal thread to engage on the end of a conduit pipe, and the external thread to correspond with the thread shown in the coupling in Fig. 3. One end of the bushing C is fitted with a lip B having shoulder $h$ for one-half its periphery $f$. This shoulder $h$ acts as a stop to abut the thread end of the pipe; also as a key for a turning medium later described. The other end of the bushing has a series of slots or indentures $e$ allowing for expansion of the sleeve when threaded onto the end of a pipe.

Fig. 2 shows a bushing identical with Fig. 1. The two bushings making up the coupling will mate at the lines $b$ and $h$.

Fig. 3 shows a longitudinal section of the bushing C. The internal thread is indicated by $c$. The external thread by $a$. In case the bushing is made of rolled or stamped metal the thread $c$ will correspond in number and pitch with $a$. B is the overturned lip whose shoulder will abut the end of the conduit pipe, and prevent the sleeve from being screwed on the pipe beyond a predetermined point.

Figure 5:
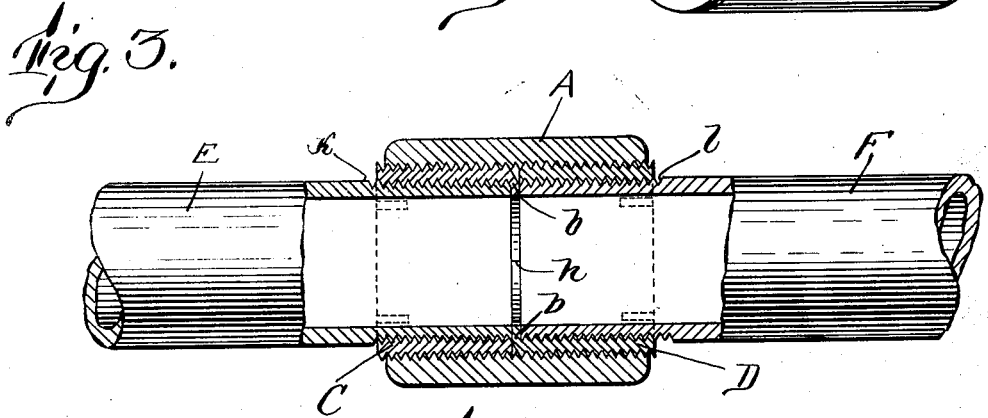
Fig. 5 is a sectional view of the parts connected with the ends of two conduit pipes.
Figure 6:
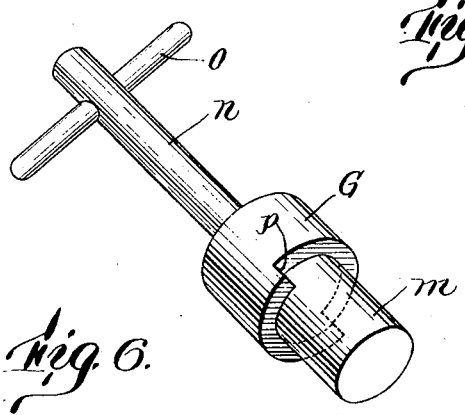
Fig. 6 is a perspective view of a wrench used in assembling the parts of the coupling.

Fig. 5 illustrates two threaded ends of conduit pipes E and F fitted with the two threaded bushings C. The coupling or sleeve A is shown screwed into place. In "making up" the coupling the ends of the pipes E and F are fitted with screw shell bushings C. In order to screw them on easily without injuring the threads, a special wrench is used, as shown in Fig. 6. When the threaded shells are placed on the ends of the pipes, and the pipes brought together so that the bushings will mate, the outside threads will be continuous; and the coupling A is slid along the pipe and screwed onto the threaded bushings in the direction of the arrow.

The slots or indentures on the bushings remain in their original position when screwed onto the end of the pipe, with a thread $l$ on pipe F. On pipe end E the threaded end stops at $k$. The enlarged diameter of the pipe at this point necessarily expands the end of the threaded bushing, making the periphery of the bushing larger than the inside diameter of the threaded coupling C. This expansion in effect limits the distance the coupling may be screwed in place, and also insures a locking feature to hold the coupling from being easily released.

The special wrench shown in Fig. 6, consists of a shank $n$ terminating in a plug $m$, and spaced from its end is a cam-like cylinder G provided at its outer end with an abutment $p$ on each side. To use the wrench when a joint is to be made up its end $m$ is inserted into bushing C and its abutment $p$ locked with its lips B and by turning the wrench by its bar $o$ the bushing is screwed onto the end of the conduit; and the second bushing is attached to the end of the second conduit in the same manner, and then the coupling A slid along and screwed over the two bushings, as previously described.

I claim as my invention:

1. A coupling for conduit pipes composed of two bushings and an inclosing and uniting sleeve for the same, each bushing internally and externally screw-threaded and having one or more slits in their outer edges; the inner edges having semi-circumferential lips whose abutting ends are adapted to lock to each other, the said sleeve being internally screw-threaded and adapted to inclose the said bushings and couple them.

2. A coupling for conduit pipes, A, composed of two bushings and an inclosing and uniting union or sleeve, each bushing internally and externally screw-threaded and having two or more slits in their outer edges; the inner edges having semi-circumferential lips whose abutting ends are adapted to lock to each other, the sleeve being internally screw-threaded and adapted to couple the bushings, the three parts made of thin metal and the screw-threads stamped or rolled in them.

3. The combination of the screw-threaded ends of two conduit pipes, and a coupling composed of two bushings and an inclosing and uniting union or sleeve, each bushing internally and externally screw-threaded and having two or more slits in their outer edges, the inner edges having semi-circumferential lips whose abutting ends are adapted to lock to each other; the sleeve being internally screw-threaded and adapted to couple the bushings, the three parts made of thin metal and the screw-threads stamped or rolled in them.

In testimony whereof, I have signed my name to this specification in the presence of two subscribing witnesses, this 28th day of April, 1920.

FREDERIC WM. ERICKSON.

Witnesses:
   LEILA H. ERICKSON,
   LELIA H. CARTER.